T. E. BARNUM.
ELECTRIC SWITCH.
APPLICATION FILED NOV. 25, 1905.
1,071,200.
Patented Aug. 26, 1913.
6 SHEETS—SHEET 1.
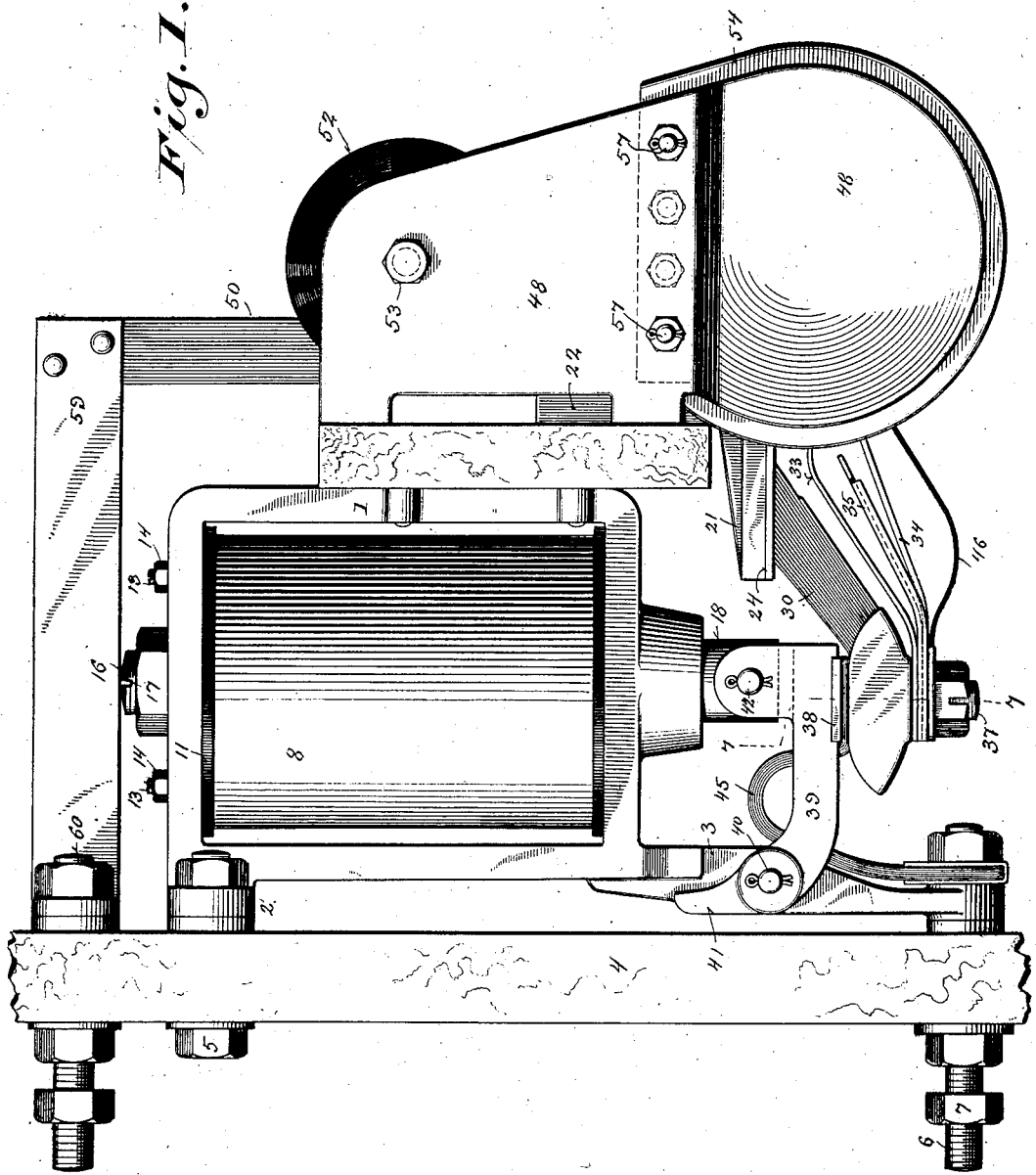
Fig. I.
Witnesses:
Fred Palm.
J. F. Hawkins
Inventor:
Thomas E. Barnum
By: Edwin B. H. Tower Jr.
Attorney.

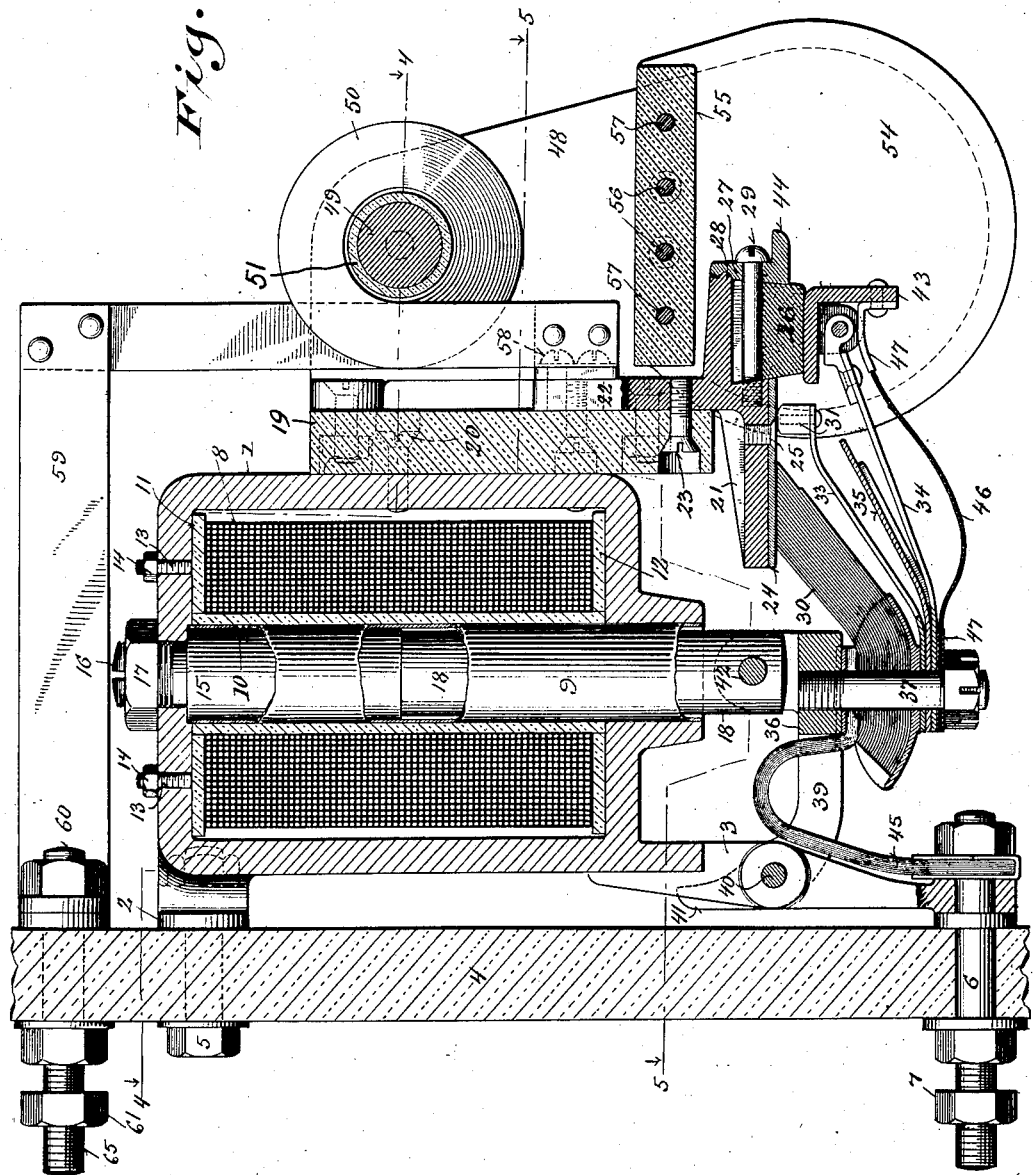

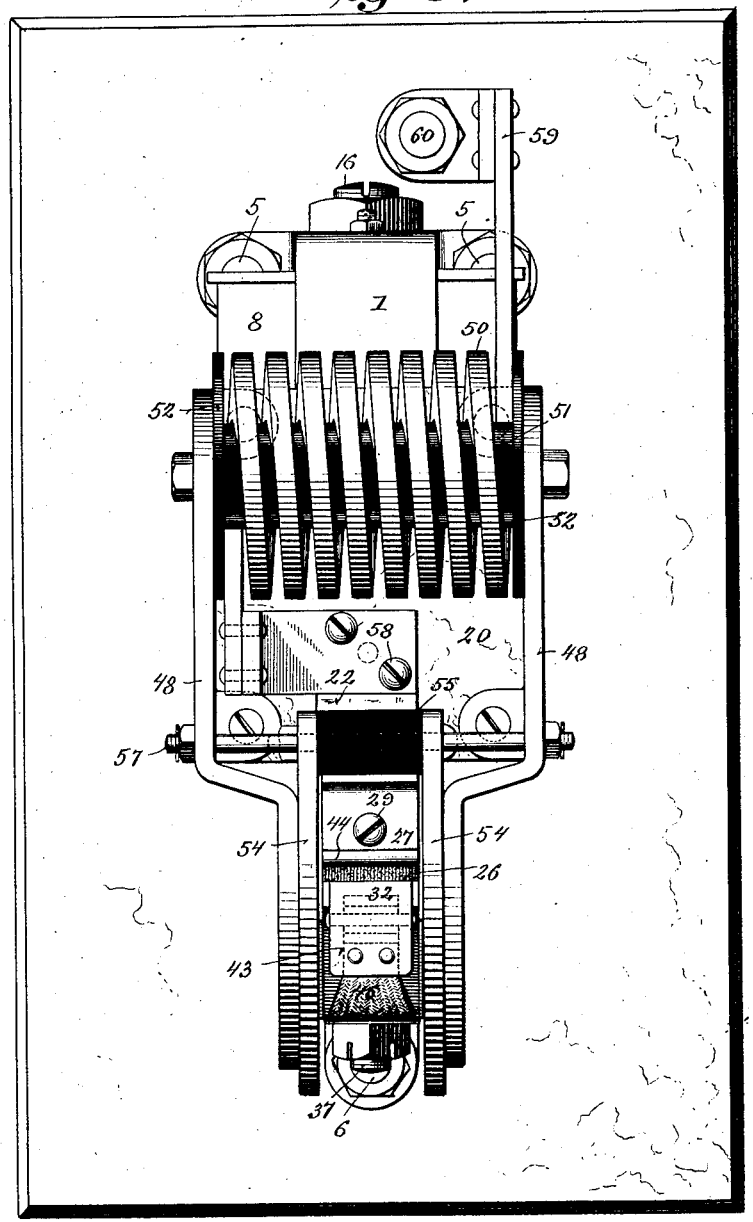

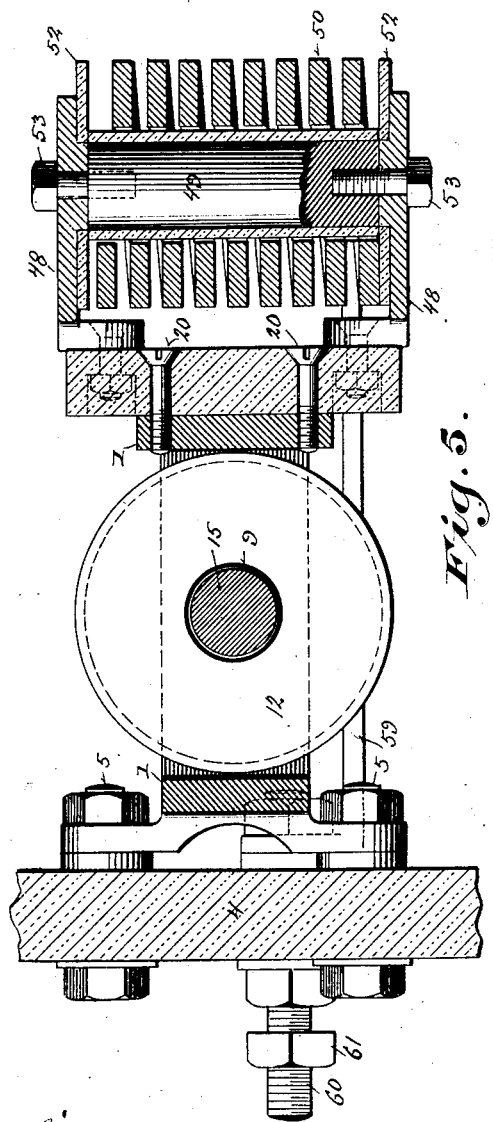

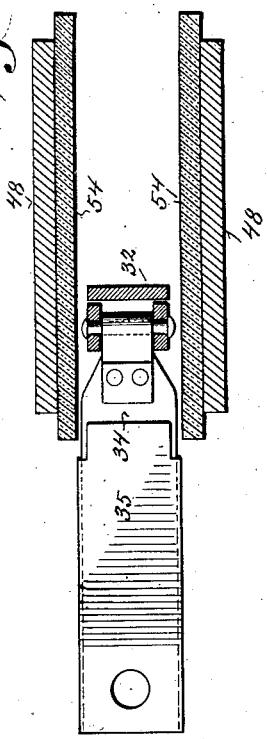
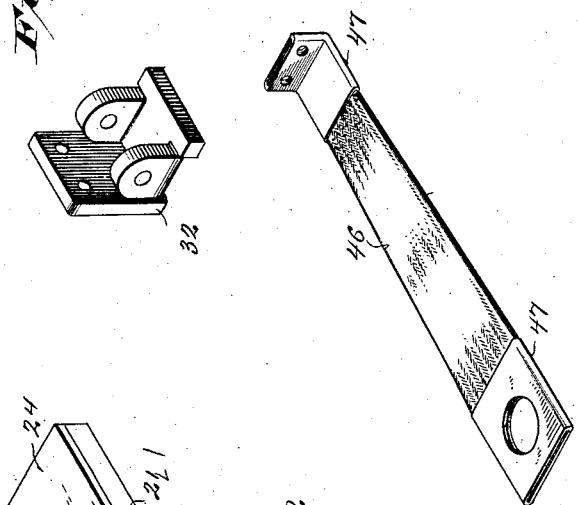
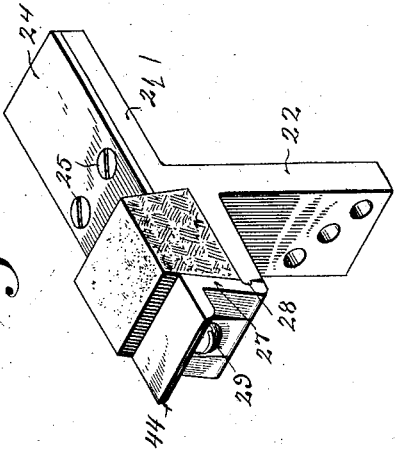
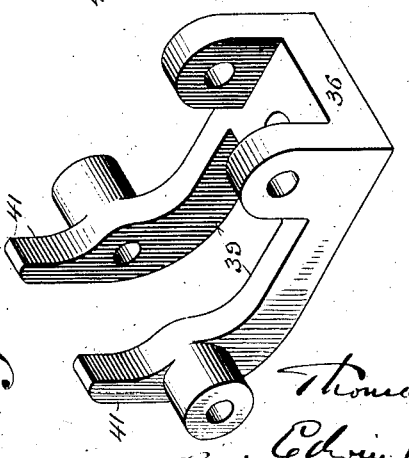

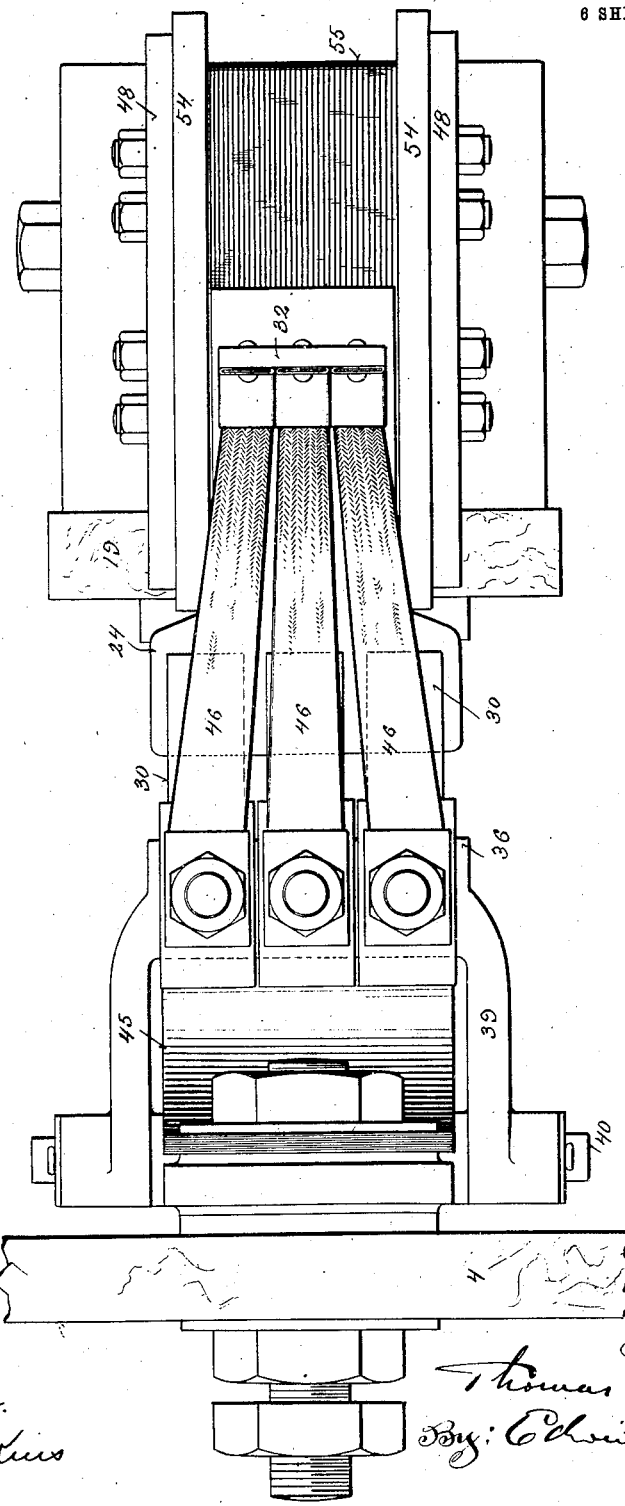

UNITED STATES PATENT OFFICE.

THOMAS E. BARNUM, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

ELECTRIC SWITCH.

1,071,200.

Specification of Letters Patent.

Patented Aug. 26, 1913.

Application filed November 25, 1905. Serial No. 289,070.

*To all whom it may concern:*

Be it known that I, THOMAS E. BARNUM, a citizen of the United States, residing at Milwaukee, in the county of Milwaukee and State of Wisconsin, have invented new and useful Improvements in Electric Switches, of which the following is a full, clear, concise, and exact description, reference being had to the accompanying drawing, forming a part of this specification.

My invention relates to improvements in electric switches or contactors.

It has for its object to provide an electric switch with certain improvements which will be hereinafter fully explained.

In order to fully set forth my invention, I shall describe the switch which is illustrated in the accompanying drawing.

Figure 1 is a side elevation of a switch which embodies my invention. Fig. 2 is a longitudinal sectional view on the line 2—2 of Fig. 5. Fig. 3 is a front view. Fig. 4 is a horizontal sectional view on the line 4—4 of Fig. 2. Fig. 5 is a horizontal sectional view on the line 5—5 of Fig. 2. Fig. 6 is a bottom view in section of parts of the arcing contact and the pole pieces. Fig. 7 is a sectional view on the line 7—7 of Fig. 1. Fig. 8 is a perspective view of the pivoted contact arm. Fig. 9 is an inverted perspective view of the stationary contacts and the support therefor. Fig. 10 is a perspective view of the arcing contact. Fig. 11 is a perspective view of the flexible connector of the arcing contact, and, Fig. 12 is a bottom view of a switch having three sets of contacts.

The switch which is shown in the drawing is provided with a frame 1 which is preferably rectangular in form. The frame is preferably provided at the top with outwardly extending supporting feet 2 and at the bottom with a downwardly extending supporting foot 3. The frame is preferably mounted upon an insulating base 4 to which the feet 2 are attached by means of bolts 5. The foot 3 is preferably attached to the base 4 by means of a bolt 6. The bolt 6 is preferably provided with a nut 7 by means of which a cable or conductor may be connected thereto.

The frame 1 carries a winding or solenoid 8 through which extends a non-magnetic tube 9. An insulating tube or sheath 10 is preferably arranged between the tube 9 and the winding 8. Insulating disks 11 and 12 are preferably placed between the winding 8 and the frame 1. The winding is preferably firmly held in position by means of screws 13, which are threaded into the frame 1 and bear upon the insulating disk 11. Each of these screws is preferably provided with a set nut 14. A stationary core 15 extends down into the non-magnetic tube 9, and it is preferably fastened to the top of the frame 1 by means of a stud 16, upon which is threaded a nut 17. A movable plunger or core 18 preferably extends up into the non-magnetic tube 9, and it serves to operate the movable switch contacts, as shall be hereinafter explained.

The frame 1 carries an insulating base or block 19, which is preferably fastened thereto by means of screws 20. A contact support 21 is mounted upon the base 19, it preferably being provided with an upwardly extending arm 22, which is fastened to said base by means of screws 23. The contact support is preferably provided with a removable contact plate 24, which is attached thereto by means of screws 25. The contact support carries a wedge-shaped carbon contact 26. The carbon contact is preferably set within a wedge-shaped opening or recess formed by the contact support 21 and a clamping plate 27. The plate 27 is preferably hinged upon the contact support 21 by means of a bead or projection 28 which extends into a recess. The contact support and the clamping plate are connected by a bolt 29 by means of which the same are caused to hold the carbon contact in place. The bolt passes through the clamping plate, and it is threaded in the contact support. In order to remove the carbon contact the bolt may be loosened to release the same. The carbon contact is provided with a groove to receive the bolt so that it may be removed without disconnecting the bolt from the contact support.

The stationary contact plate 24 is adapted to be engaged by a main contact or brush 30, and an auxiliary contact 31, and the carbon contact 26 is adapted to be engaged by an arcing contact 32. The main contact 30 is flexible so that when it engages the stationary contact, it will rub over the plate 24. It is preferably made of laminations or leaves which are fastened in a cup. The auxiliary contact is preferably mounted upon a flexible or spring arm 33. The arcing contact 32 is preferably pivoted upon a spring arm 34, which normally bears against a stop or plate 35. The main contact 30, the arm 33, the plate 35, and the arm 34 are preferably carried by a pivoted arm 36, the same being mounted upon a stud 37 and clamped in position by means of a nut. The main contact, the arms 33 and 34, and the plate 35, are preferably prevented from turning by means of a locking plate 38. The contact arm 36 is preferably provided with two forks 39, between which extends the foot 3. These forks are preferably pivoted to the foot 3 by means of a pin 40. Each fork is preferably provided with a lug or stop 41 which is adapted to engage the frame 1 to limit the downward movement of the arm 36. The plunger or core 18 is preferably pivoted to the arm 36 by means of a pin 42. When the winding 8 is energized, the plunger 18 will be drawn upwardly to raise the arm 36, thereby bringing the movable contacts into engagement with the stationary contacts and when said winding is deënergized said plunger will fall, thereby removing the movable contacts from engagement with the stationary contacts. The movable contacts are so arranged that the main contact, the auxiliary contact, and the arcing contact will leave the stationary contacts one after the other in the order named. The auxiliary contact will therefore carry the current while the main contact is being removed from the contact plate 24, thereby preventing arcs between the main contact and the stationary contact. The arcing contact is preferably provided with a downwardly extending plate or wall 43, and the plate 27 is preferably provided with an outwardly extending plate or wall 44. When the arcing contact is removed from the carbon contact, the arc will run down the plate 43 and out the plate 44 until it is extinguished. The plates 43 and 44 prevent the arc from reaching the parts in rear of the same.

The bolt 6 is preferably connected to the movable contacts by means of a flexible connector or strip 45. The flexible connector is preferably bent so that it will permit the arm 36 to move freely, and it is preferably arranged between the forks 39 so as to be compactly assembled. The arcing contact 32 is preferably electrically connected to the stud 37 by means of a braided or flexible conductor 46 which carries the current. The braided conductor 46 is preferably provided with terminals 47, which are formed by means of tubes pressed upon the ends of said conductor.

A blow-out magnet for extinguishing the arc between the carbon contact and the arcing contact is mounted upon the base 19. It is preferably provided with pole pieces 48, which are attached to the base 19. A core 49 which extends between the pole pieces carries a blow-out coil 50. An insulating tube 51 is preferably arranged between the blow-out coil and the core 49, and insulating disks 52 are preferably arranged between the blow-out coil and the pole pieces. The core 49 is preferably held in position by means of bolts 53, which pass through the pole pieces. These bolts may be taken out, and then the blow-out coil may be removed from place without disturbing the position of the pole pieces. The pole pieces are provided with polar extensions or faces between which sets an insulating barrier or chute. The arcing contact 32 and the carbon contact 26 are arranged within the insulating barrier or chute. The insulating barrier is preferably made of insulating plates or disks 54, which are attached to an insulating block 55 by means of bolts 56. The insulating barrier is supported by the pole pieces, and it is held in place by bolts 57. These bolts may be taken out and then the barrier may be removed from place without disturbing the position of the pole pieces. Inasmuch as the bolts 57 are arranged outside of the polar faces or arc zone, the same will not interrupt the magnetic field.

The blow-out coil has one end connected to the arm 22 by means of screws 58, and the other end to a strip 59 which extends to a bolt 60. The bolt 60 is provided with a nut 61 by means of which a conductor or cable may be attached thereto. The bolts 6 and 60 form the terminals of the switch. The circuit of the switch extends from the terminal bolt 6, through flexible connector 45, main contact 30, contact plate 24, contact support 21, arm 22, blow-out coil 50, and strip 59, to bolt 60.

It will be noted that the switch is so constructed and arranged that certain parts may be removed and replaced without disturbing other parts. The contact arm with the elements carried thereby may be taken from place by removing the pins or pivots 40 and 42, and disconnecting the conductor 45 from bolt 6. The winding 8 may be taken from place by removing the stationary core 15, the movable core 18 and non-magnetic tube 9. It will further be noted that the construction of the switch is such that it may be removed from the base 4 without disconnecting the elements which complete the circuit thereof.

Where the switch is required to carry heavy currents, the contact arm may be provided with several main contacts, as illustrated in Fig. 12.

It will be understood that certain features of my invention are applicable to switches of various forms and that the switch illustrated in the drawing may be changed in many ways without eliminating the features which my invention provides.

Having thus described my invention what I claim as new and desire to secure by Letters Patent is:

1. In an electric switch, a magnetic frame forming a supporting member for the switch, an electro-magnetic winding mounted upon said frame and surrounded thereby, a plunger arranged within said winding, a stationary contact carried by said frame and suitably insulated therefrom, an arm pivoted upon said frame and connected to said plunger, a laminated flexible contact carried by said arm and adapted to engage said stationary contact, pole pieces carried by said frame and having the polar faces thereof arranged upon opposite sides of said stationary contact, an insulating chute arranged between said polar faces and having said stationary contact arranged therein, said insulating chute being removably supported by said pole pieces, and a blow-out coil arranged between said pole pieces above said chute and supported by said pole pieces.

2. In an electric switch, a magnetic frame forming a supporting member for the switch, an electro-magnetic winding mounted upon said frame and surrounded thereby, a plunger arranged within said winding, a stationary contact carried by said frame and suitably insulated therefrom, an arm pivoted upon said frame and connected to said plunger, a laminated flexible contact carried by said arm and adapted to engage a stationary contact, pole pieces carried by said frame and having the polar faces thereof arranged upon opposite sides of said stationary contact, an insulating chute or barrier arranged between said polar faces and having said stationary contact arranged therein, said insulating chute being removably supported by said pole pieces, a blow-out coil arranged between said pole pieces above said chute and supported by said pole pieces, one terminal of said blow-out coil being connected to a binding post, and the other terminal thereof being connected to said stationary contact, and a flexible connection between said laminated contact and another binding post.

3. In an electric switch, in combination, a frame forming a supporting member for the switch and having suitable parts adapted to be attached to a support, an electro-magnetic winding mounted upon said frame and surrounded thereby, a plunger arranged within said winding, a main contact and a carbon contact carried by said frame, an arm pivoted upon said frame, a laminated flexible contact and an arcing contact carried by said arm, said laminated contact being adapted to engage said main contact and said arcing contact being adapted to engage said carbon contact, pole pieces carried by said frame and arranged on opposite sides of said carbon contact, a blow-out coil arranged between said pole pieces and supported thereby, said blow-out coil being arranged above said carbon contact, and an insulating chute removably supported by said pole pieces between the polar faces thereof, said arcing contact and said carbon contact being arranged within said chute.

4. In an electric switch, in combination, a frame forming the supporting member of a switch, an electro-magnetic winding mounted upon said frame and surrounded thereby, a plunger arranged within said winding, a stationary contact carried by said frame, a pivoted arm, a contact carried by said arm and adapted to engage said stationary contact, pole pieces mounted upon said frame and both extending outwardly therefrom and arranged at right angles to the front of said frame, said pole pieces having their lower portions forming polar faces arranged on opposite sides of said stationary contact, an insulating chute arranged between the polar faces of said pole pieces, said stationary contact being arranged within said chute, and a blow-out coil arranged between the upper parts of said pole pieces.

5. In an electric switch, in combination, a frame forming the supporting member of the switch and adapted to be attached to a suitable support, an electro-magnetic winding mounted upon said frame and surrounded thereby, an insulating block mounted upon the front of said frame, a stationary contact carried by said block, an arm pivoted upon said frame and connected to a plunger arranged within said winding, a main contact and an arcing contact carried by said arm, and adapted to engage said stationary contact, pole pieces mounted upon said block and both extending outwardly therefrom, the lower portion of said pole pieces forming polar faces arranged upon opposite sides of said stationary contact, an insulating chute supported by said pole pieces between said polar faces and having said stationary contact arranged therein, and a blow-out coil arranged between the upper portions of said pole pieces and supported thereby.

6. In an electric switch, in combination, a frame forming a supporting member for the switch and adapted to be attached to a suitable support, an electro-magnetic winding mounted upon said frame and surrounded thereby, a plunger arranged within said winding, an insulating block mounted upon the front of said frame, a contact support carried by said insulating block and having a main contact and a carbon contact, an arm pivoted upon said frame, a laminated contact and an arcing contact carried by said arm, said laminated contact being adapted to engage said main contact and said arcing contact being adapted to engage said carbon contact, pole pieces mounted upon said block and extending outwardly therefrom, the lower portion of said pole pieces forming polar faces arranged upon opposite sides of said carbon contact and said arcing contact, an insulating chute supported between said polar faces and having said carbon contact and said arcing contact arranged therein, and a blow-out coil arranged between the upper portion of said pole pieces and supported thereby.

7. In an electric switch, in combination, a rectangular frame forming the supporting member of said switch and having a downwardly extending leg formed upon the rear thereof, a winding arranged within said frame, a plunger arranged within said winding, an insulating block mounted upon the front of said frame, a contact support having a main contact and a carbon contact carried thereby, an arm pivoted upon said leg, a laminated contact and an arcing contact carried by said arm, said laminated contact being adapted to engage said main contact and said arcing contact being adapted to engage said carbon contact, pole pieces mounted upon said block and both extending downwardly therefrom, the lower portions of said pole pieces forming polar faces arranged upon opposite sides of said carbon contact and said arcing contact, an insulating chute arranged between said polar faces and having said carbon contact and said arcing contact arranged therein, and a blow-out coil arranged between the upper portions of said pole pieces and having one terminal thereof connected to said contact support.

8. In an electric switch, in combination, a rectangular frame forming the supporting member for the switch and having a downwardly extending leg at the rear thereof, a winding arranged within said frame, a plunger arranged within said winding, a bifurcated arm pivoted upon said leg, an insulating block mounted upon the front of said frame, a contact support carried by said block and having a main contact and a carbon contact, a laminated contact and an arcing contact carried by said arm, said laminated contact being adapted to engage said main contact and said arcing contact being adapted to engage said carbon contact, a flexible connection extending between said main contact and a bolt passing through said leg, said bolt forming one of the switch terminals and said flexible connector being looped to pass between the bifurcations of said arm, pole pieces mounted upon said block and both extending outwardly therefrom, the lower portions of said pole pieces forming polar faces arranged on opposite sides of said carbon contact and said arcing contact, an insulating chute mounted between said polar faces and having said carbon contact and said arcing contact arranged within the same, a blow-out coil mounted between the upper portions of said pole pieces, one terminal of said blow-out coil being connected to said contact support, and the other to one of the terminals of said switch.

9. In an electric switch, in combination, a pivoted switch arm, an operating member pivoted thereto, a bolt projecting from said arm and substantially in line with the pivotal connection between said arm and said operating member, a main contact brush and an arcing contact mounted directly upon the shank of said bolt.

10. In an electric switch, in combination, a pivoted switch arm, an operating member pivoted thereto, a bolt projecting from said arm and substantially in line with the pivotal connection between said arm and said operating member, a main contact brush and an arcing contact mounted directly upon the shank of said bolt and a device mounted on the shank of said bolt for positively holding said contacts against rotary movement on said bolt.

11. In an electric switch, in combination, a pivoted switch arm, a laminated main contact and a yielding arcing contact carried thereby, a device for positively holding said contacts in alinement with said arm, and a single bolt for securing both of said contacts and said device to said arm.

12. In an electric switch, in combination, a pivoted arm, an electro-magnetic winding for actuating same, a laminated contact and an arcing contact carried by said arm, said contacts both being held upon said arm by means of a single bolt passing through said contacts, and a plate bent to engage said arm and said contacts to prevent said contacts from turning upon said plate, said bolt also securing said plate in position.

13. In an electric switch, in combination, a frame having a supporting foot, a bolt for attaching said foot to a support, said bolt forming an electric terminal, a contact arm having forks, said supporting foot being arranged between said forks, a pivotal connection between said forks and said foot, a contact carried by said arm, a flexible conductor connecting said bolt and said contact, said conductor being bent to extend between said forks.

14. In an electric switch, in combination, a stationary contact support, a clamping piece, a wedge-shaped carbon contact arranged within a wedge-shaped recess formed by said support and said piece, a bolt extending through said piece and threaded into said block, said carbon contact being provided with a groove to receive said bolt.

15. In an electric switch, in combination, a pivoted arcing contact, a contact support, a carbon contact carried by said support, a clamping piece having a portion interfitting with said support, a screw passing through said clamping piece and threaded into said support, a plate or wall extending from said clamping piece to protect said screw from the arc, and a plate or wall extending from said arcing contact to protect the parts in rear thereof from the arc.

16. In an electric switch, in combination, a main supporting frame, an electro-magnetic winding carried thereby, a contact arm pivoted upon said frame and adapted to be actuated by said winding, a flexible contact carried by said arm, a stationary terminal bolt for fastening a part of said frame to a support, a flexible connection between said bolt and said flexible contact, an insulating base carried by said frame, a stationary contact carried by said base, an arcing contact carried by said contact arm, a carbon contact carried by said stationary contact and adapted to be engaged by said arcing contact, pole pieces carried by said base, a blow-out coil carried by said pole pieces and having one end thereof connected to said stationary contact, a conducting strip extending from the other end of said coil, a terminal bolt connected to said conducting strip, and a three-sided insulating chute made into a unitary structure and arranged between said pole pieces, said chute being carried by said pole pieces and having said arcing contact and said carbon contact arranged within the same, all combined into a unitary structure.

17. In an electric switch, in combination, a frame forming a supporting member for the switch, an electro-magnetic winding carried by said frame, pole pieces mounted upon the front of said frame and extending outwardly therefrom and arranged at right angles to said front, the lower portion of said pole pieces forming polar faces, an insulating chute or barrier arranged between said polar faces and supported in position by means arranged above said polar faces, so as to leave a free path for the magnetic circuit between said polar faces, a blow-out coil mounted between the upper portions of said pole pieces and switch contacts arranged within said chute.

18. In an electric switch, in combination, a frame forming a supporting member, an electro-magnetic winding for operating the switch, said winding being carried by said frame, pole pieces mounted upon the front of said frame and both extending outwardly therefrom, the lower portion of said pole pieces forming polar faces, a three-sided insulating chute arranged between said polar faces and held in position by means of bolts arranged above said polar faces so as to leave a free path for the magnetic field between said polar faces, said chute being adapted to be removed from position without disturbing the position of said pole pieces, and switch contacts arranged within said chute.

19. In an electric switch, in combination, a frame forming a supporting member for the switch, an electro-magnetic winding mounted upon said frame and serving to actuate the switch, an insulating block mounted upon the front of said frame, pole pieces mounted upon said block and both extending outwardly therefrom, the lower portion of said pole pieces forming polar faces, an insulating chute arranged between said polar faces and held in position by means arranged above said polar faces so as to leave a free path for the magnetic field between said faces, switch contacts being arranged within said chute, a removable core extending between the upper portions of said pole pieces and a blow-out coil surrounding said core.

20. In an electric switch, in combination, a rectangular magnetic frame forming the supporting member for the entire switch, and having parts adapted to be attached to a suitable support, an electro-magnetic winding arranged within said frame and surrounded thereby, a plunger arranged in said winding, a contact arm pivoted upon said frame, and connected to said plunger, an insulating block mounted on said frame, a stationary contact support carried by said block, main contacts carried by said support and said arm, one of said contacts being laminated, arcing contacts carried by said support and said arm, parallel pole pieces mounted upon the front of said frame and extending outwardly therefrom, the lower portions of said pole pieces forming polar faces arranged on opposite sides of said arcing contacts, an insulating chute or barrier arranged between said polar faces and having said arcing contacts arranged therein, and a blow-out coil arranged between said pole pieces.

21. In an electric switch, the combination with a substantially rectangular magnet frame arranged to be secured to a supporting panel and to project at right angles thereto, said frame forming the supporting member of the switch, of an insulating block secured to the front perpendicular member of said frame, a blowout magnet having pole pieces secured to said insulating block and projecting forwardly therefrom, said pole pieces having downwardly projecting extensions forming polar faces and a stationary contact carried by said insulating block and arranged between said polar faces.

22. In an electric switch, in combination a substantially rectangular magnet frame forming the supporting member of the switch, an insulating block secured to the front perpendicular member of said frame, a blowout magnet having pole pieces secured to said insulating block, and projecting outwardly therefrom, said pole pieces having downwardly projecting extensions forming polar faces, an insulating chute arranged between said polar faces and supported thereby and a stationary contact arranged within said insulating chute.

In witness whereof, I have hereunto subscribed my name in the presence of two witnesses.

THOMAS E. BARNUM.

Witnesses:
 WALTER E. SARGENT,
 W. R. FENNO.